(12) United States Patent
Serdy, Jr. et al.

(10) Patent No.: US 7,853,593 B2
(45) Date of Patent: Dec. 14, 2010

(54) CONTENT MARKUP TRANSFORMATION

(75) Inventors: Frank S. Serdy, Jr., Sammamish, WA (US); Rainer J Romatka, Bellevue, WA (US); Michael S. Agney, Issaquah, WA (US); Shyam S. Habarakada, Seattle, WA (US); Sarthak D Shah, Krkland, WA (US)

(73) Assignee: Microsoft Corporation, Redmond, WA (US)

( * ) Notice: Subject to any disclaimer, the term of this patent is extended or adjusted under 35 U.S.C. 154(b) by 481 days.

(21) Appl. No.: 11/689,335

(22) Filed: Mar. 21, 2007

(65) Prior Publication Data

US 2008/0235573 A1 Sep. 25, 2008

(51) Int. Cl.
*G06F 17/101* (2006.01)
(52) U.S. Cl. .................... 707/736; 707/705; 707/758; 707/759
(58) Field of Classification Search ............... 707/1–10, 707/736
See application file for complete search history.

(56) References Cited

U.S. PATENT DOCUMENTS

| | | | |
|---|---|---|---|
| 6,247,048 B1 | 6/2001 | Greer et al. | |
| 6,611,358 B1 | 8/2003 | Narayanaswamy | |
| 6,880,014 B2 | 4/2005 | Brown et al. | |
| 6,925,595 B1* | 8/2005 | Whitledge et al. | 715/234 |
| 6,971,060 B1* | 11/2005 | Bujak et al. | 715/234 |
| 7,020,685 B1* | 3/2006 | Chen et al. | 709/204 |
| 7,024,460 B2* | 4/2006 | Koopmas et al. | 709/206 |
| 7,031,314 B2* | 4/2006 | Craig et al. | 370/392 |
| 7,054,952 B1 | 5/2006 | Schwerdtfeger et al. | |
| 7,120,702 B2 | 10/2006 | Huang et al. | |
| 7,444,418 B2* | 10/2008 | Chou et al. | 709/231 |
| 2001/0037405 A1* | 11/2001 | Sideek | 709/246 |
| 2002/0102998 A1 | 8/2002 | Lin | |
| 2003/0004984 A1* | 1/2003 | Chou | 707/500 |
| 2003/0018796 A1* | 1/2003 | Chou et al. | 709/231 |
| 2003/0053448 A1* | 3/2003 | Craig et al. | 370/353 |
| 2003/0115365 A1* | 6/2003 | Lindsey | 709/246 |
| 2004/0002325 A1* | 1/2004 | Evans et al. | 455/414.1 |
| 2004/0034853 A1* | 2/2004 | Gibbons et al. | 717/174 |
| 2004/0148571 A1* | 7/2004 | Lue | 715/514 |
| 2006/0168129 A1 | 7/2006 | Van Geest et al. | |

(Continued)

FOREIGN PATENT DOCUMENTS

WO WO0186462 A1 11/2001

OTHER PUBLICATIONS

"ByteMobile Issued U.S. Patent Covering Core Technology for Wireless Adaptation and Optimization", Jan. 15, 2009; ByteMobile; 2009 News Archive; www.bytemobile.com/news-events.*

(Continued)

*Primary Examiner*—Mohammad Ali
*Assistant Examiner*—Sheryl Holland
(74) *Attorney, Agent, or Firm*—Lee & Hayes, PLLC

(57) ABSTRACT

Methods of correcting and transcoding markup language content for mobile devices are described. In an example, mobile device capabilities are determined. Content is processed to correct malformed tags in the content based on the determination. The corrected content is transcoded from a first markup language which is not supported by a mobile device into a second markup language which is supported by the mobile device.

18 Claims, 4 Drawing Sheets

U.S. PATENT DOCUMENTS

2006/0271642 A1* 11/2006 Stavrakos et al. ........... 709/217
2007/0266113 A1* 11/2007 Koopmans et al. .......... 709/217

OTHER PUBLICATIONS

"ByteMobile Issued U.S. Patents Covering Core Technology for Wireless Data Network Optimization", May 30, 2006; ByteMobile; 2006 News Archive; www.bytemobile.com/news-events.*

Braun, Peter; "The Migration Process of Mobile Agents—Implementation, Classification, and Optimization", PHD Thesis; Apr. 30, 2003; Friedrich-Schiller-Universitat Jena.*

"ByteMobile Launches New Optimization Solutions for High Speed Wireless Data Netorks", Aug. 23, 2006; ByteMobile; 2006 News Archive; www.bytemobile.com/news-events.*

"ByteMobile Unison Solution Delivers Multiple Optimization Services on Single System Platform for Wireless Data Networks", May 31, 2006; ByteMobile; News Archives; www.bytemobile.com/news-events.*

Britton, et al., "Transcoding: Extending e-business to new environments", available as early as Dec. 21, 2006 at <<http://www.research.ibm.com/journal/sj/401/britton.pdf>>, IBM Systems Journal, vol. 40, No. 1, 2001, pp. 153-178.

Butler, et al., "Device Independence and the Web1", at <<http://www.hpl.hp.com/research/papers/2003/device_independence.pdf>>, Oct. 2, 2002, IEEE, Internet Computing, Sep./Oct. 2002, pp. 11.

Smith, et al.,"Transcoding Internet content for heterogeneous client devices", available as early as Dec. 21, 2006 at <<http://www.research.ibm.com/networked_data_systems/transcoding/Publications/iscas98.pdf>>,IEEE Conference on Circuits and System. (ISCAS), May 1998, pp. 4.

* cited by examiner

CONTENT MARKUP TRANSFORMATION

BACKGROUND

Markup languages are utilized to control data presentation to electronic device users. In a computing environment, for instance, users are typically provided content that may include images, textual data and the like information for presentation. A markup language may be implemented to control the way in which this content is presented, such as providing data hierarchies. An example of a hierarchy is to separate a textual portion into a title portion which is distinct from the bulk of the text, given a particular alignment, or provided with a special characteristic. Additionally, a markup language may be utilized for determining the display of an image, such as an image file for presentation on a display.

While the Internet has experienced phenomenal growth, implementation of particular markup languages, such as hypertext markup language (HTML), may create drawbacks for certain devices. Drawbacks may include, but are not limited to, improperly formatted markups, images exceeding the display capability of the device, ill-formed content data, ill-formed tables, harmful markups being forwarded to the device, incomplete markup (e.g. a missing closing markup), missing links and similar issues that may diminish the user's experience. These issues may be particularly troublesome for "thin" client devices. Thin client devices may include those devices having limited capabilities in comparison to the data to be handled, such as mobile devices including smart phones, cellular phones, and so on.

Commonly, hypertext markup language (HTML) is utilized to author information on the Internet (the World Wide Web or "the web"). HTML is utilized to provide the "feel" to the content being provided, e.g., HTML may be implemented to control the way in which the content data is presented to the user in order to provide the desired experience.

For instance, a smart phone user, browsing the Internet, may be confronted with an image with dimensions larger than the phone's display. In other instances, data often is ill-formed for thin device access or data is ill-communicated for the device's capabilities. In some cases, a website is unavailable to a mobile device. From the web-side perspective, including alternate markup which is thin device friendly may be time consuming and increase the overall expense of providing content.

Mobile devices may also suffer from "browsing" issues associated with accessing different content sources as the user "surfs" the web. Links or uniform resource locators (URL) are utilized to direct the browser to the address for the desired content. Therefore, a link may be included in content that may be rendered by a thick client that may not be rendered by a thin client. Thus, while a mobile browser may display a first website correctly, accessing an external source (a second website page) may result in ill-handled content and decrease the overall mobile browsing experience.

SUMMARY

Methods of correcting and transcoding markup language content for mobile devices are described. In an example, mobile device capabilities are determined. Content is processed to correct malformed tags in the content based on the mobile device's determined capabilities. The corrected content is transcoded from a first mark-up language, which is not supported by a mobile device, into a second markup language which is supported by the mobile device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Accordingly, techniques are described to process content for display by a "thin" client. In one or more implementations, a system is discussed which utilizes transforming and transcoding modules to process incomplete first-markup language into content which is supported by a mobile device.

In an implementation, a technique is described in which content is transformed for transcoding into a mobile browser supportable language. For example, HTML web content may be corrected to "fill-in" malformed markup tags. Included content may be reformed in accordance with the capabilities of the mobile target browser for facilitating a rich mobile browsing experience. Continuing with the previous example, the corrected content may be transcoded into a language which is understood by the mobile device. In other instances, a procedure is implemented to proxy URL identified first-markup language content into supported content for presentation on a mobile browser 113. Further discussion of content processing may be generally found in the discussion with respect to FIG. 3.

In the following discussion, an exemplary environment is first described that is operable to convert ill-formed content into mobile browser supported content. Additionally, a link rewriting functionality is also described which may be included to promote mobile browser navigation.

Exemplary Environment

Figure 1:
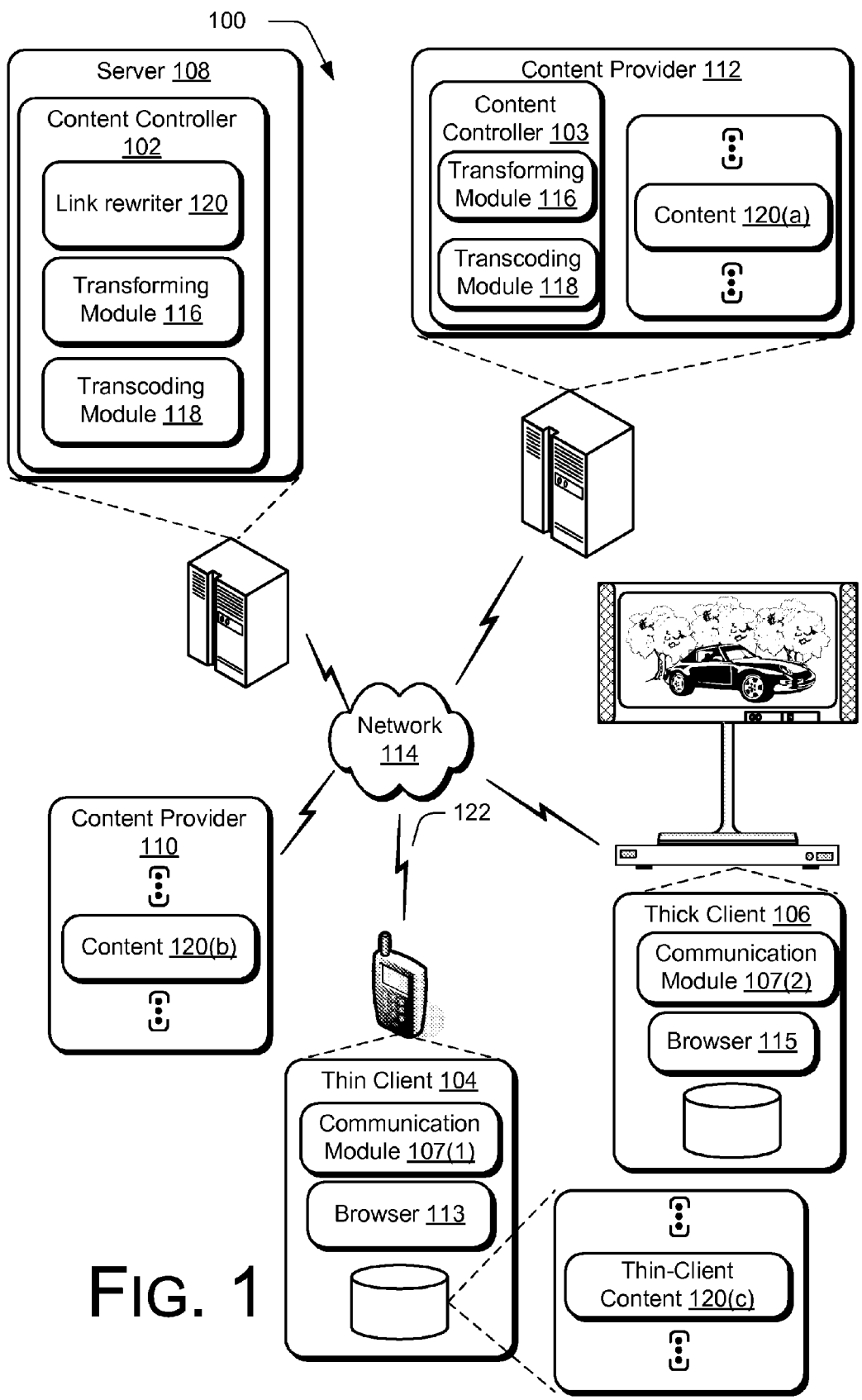
FIG. 1 illustrates an environment in an exemplary implementation that may use technologies to transform and transcode content.

FIG. 1 illustrates an environment 100 in an exemplary implementation that is operable to employ a markup content controller 102 for communication with a thin client, such as a mobile device 104. In contrast to a "thin" device, a "thick" client 106 typically includes robust capabilities, such as relatively high processing power, extensive memory, and significant data storage capability in comparison to the content being accessed. Examples of thick devices typically include hardwired desktop computers, laptops, fixed multimedia device, and so on.

In the referenced implementation, the markup content controller 102 is resident on a server 108. In this instance, the server 108 is functioning as a portal for content derived from an external content provider 110. In this way, in response to a mobile client 104 request, content may flow from the content provider 110 to the server 108, via the network 114. In other instance, a direct link may be used to transfer content from the content provider 110 to the server 108 and eventually to the client 104. Other suitable markup content controller 103 configurations include, but are not limited to, on a content provider server 112 or resident on a server interposed between a mobile device and the network 114. When the requested data is included on the content provider server 112 the requested content may flow from the content provider server through the network 114 (partially via a wireless) to the mobile device 104. In the case of the markup content controller 103 included on content provider server 112, the markup content controller and the controller components are substantially similar to markup content controller 102, discussed herein.

In the illustrated embodiment the markup content controller 102 determines the thin device's capability in order to match a known agent with the mobile device. For example, the markup content controller 102 may determine device capabilities, such as mobile browser 113, by interrogating a user-agent header, included in a hypertext transfer protocol (HTTP) request from the mobile device. For instance, ASP. NET (Microsoft Corporation, Redmond, Wash.) web application technology may be utilized. If an agent is matched using ASP.NET technology, the markup content controller 102 captures mobile browser information for use in structuring a reply. For situations in which an agent is not matched, a sufficiently similar agent is implemented. A sufficiently similar agent may be an agent having sufficiently similar browser capabilities. Browser information may include information about the device, supported markup information, screen size, specific transforming idiosyncrasies (e.g., does the browser support tables), maximum content amount, and so on.

Often, Internet content is authored in a relaxed manner that is less than fully compliant with HTML standards. While less than fully compliant content is acceptable for thick devices having robust functionality, mobile devices may have difficulty presenting content, present the data in an awkward fashion, or may be unable to present the content. The markup content controller 102 may include a transforming module 116 which is representative of the functionality to reform malformed content authored in a first-markup language, such as HTML, into corrected content. To accomplish this, the transforming module 116 may correct HTML tags to identify content presentation characteristics. In numerous instances, closing tags (markups which end a particular markup characteristic) are missing or unbalanced. In these instances, the transforming module 116 may be executed to fix this malformed content for presentation. In the previous example, the original content is corrected sufficiently to permit display on a thin device. For content including an image, the transforming module 116 may determine if the image exceeds a particular browser's capabilities. For instance, an image may exceed the browser capabilities by being of a size greater than can be displayed or having a file size which makes display impractical, such as, a high resolution image that takes an inordinate amount of time to download. In such an instance, images exceeding the browser's capacity may be resealed or the image "degraded." If for instance, an original image is greater than the device's display capabilities, the original image tag may be replaced with an image tag to the resized image designed to fit the mobile device's display capacity. Resizing may be performed by an adaptive transforming proxy such as WINDOWS (Microsoft Corp., Redmond, Wash.) Live Mobile Adaptive Transforming Proxy.

For content including "dangerous" scripts or markup tags, the transforming module 116 may be implemented to remove the offending markups prior to fixing improperly constructed tags, such as markups which do not meet a safety criteria. For instance, a JavaScript (JAVA, Sun Microsystems, Santa Clara, Calif.), included in a blog post, or rich site summary (RSS) feed, may be removed because the script is capable of including a computer virus. This functionality may be performed by a separate module included in the markup content controller 102 to compartmentalized processing. In this manner, markups that do not meet a safety criteria may be reformed to eliminate or diminish the risk to the mobile browser 113.

A transcoding module 118 is configured to receive the corrected content from the transforming module 116. Inclusion of the transcoding module 118, in the markup content controller 102, permits translation of the first-markup language content into a second-markup language that is supported by the browser. For instance, the transcoding module 118 is configured to convert HTML content into WML content for presentation on the mobile device browser The transcoding module 118 is implemented to transcode the first-language markup into a markup language that is supported by the mobile browser 113. In situations in which the second-markup language does not support an attribute (e.g., from the first-markup language content), the transcoding module 118 may strip-out the unsupported attribute, while permitting presentation of the underlying content. For instance, the transcoding module 118 may strip out a STYLE attribute from a DIV element when converting HTML content, because the browser implements compact hypertext markup language (cHTML) which does not support STYLE attributes.

Figure 2:
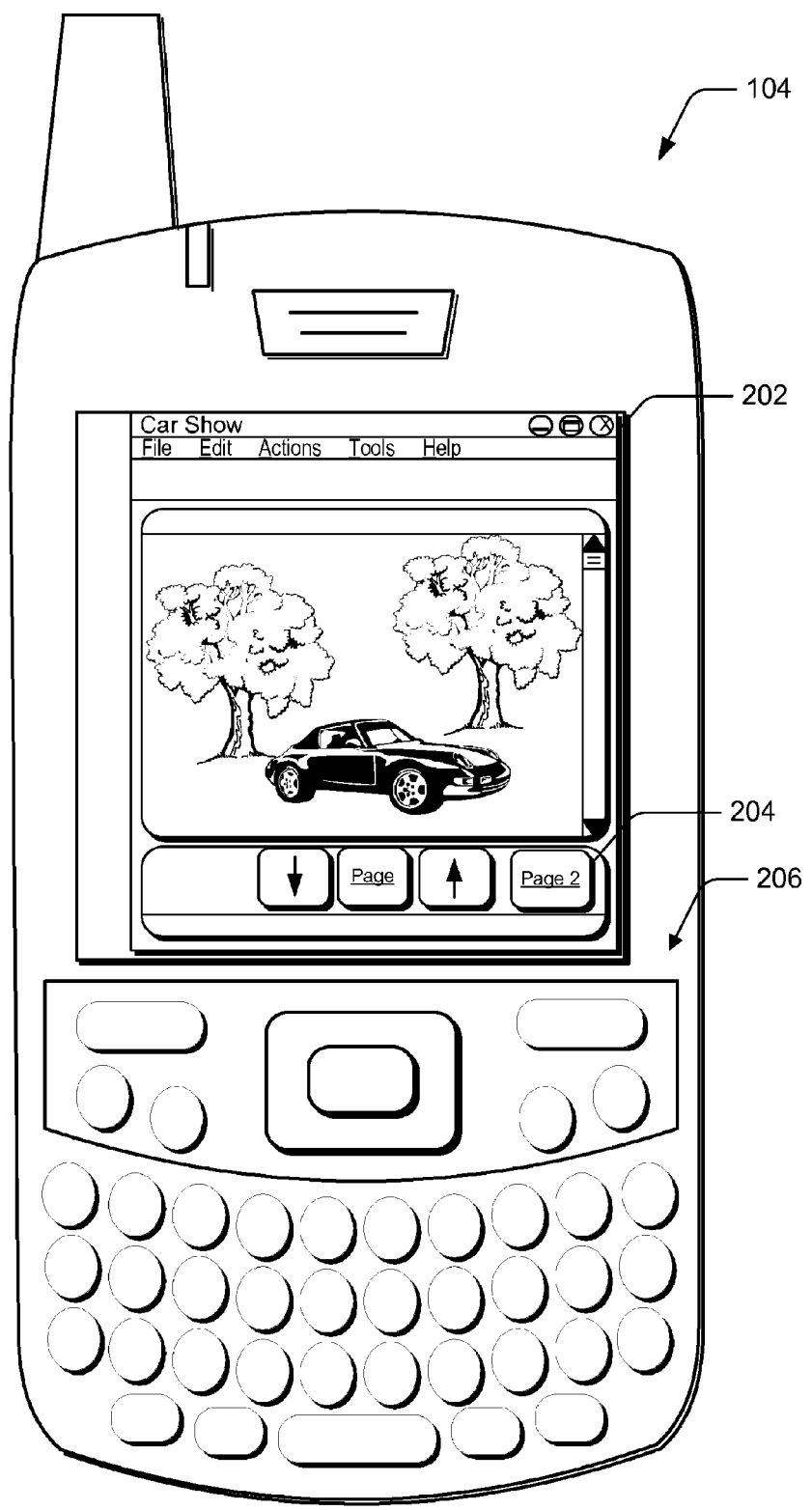
FIG. 2 is an illustration of a thin mobile device in an exemplary implementation.

For content exceeding the display capacity of the mobile device, the transcoding module 118 may be configured to paginate the content (e.g., FIG. 2, 204). Using this paginated content, a user may efficiently access content on the mobile device. For example, large amounts of text may be broken-up into pages based on a screen size 202 available to a browser 113.

A link rewriting module 120 may be included in the markup content controller 102 (as shown) although alternatively, the link rewriting module 120 may be implemented as a stand-alone component. A markup content controller 102, including the link rewriting module 120, is substantially similar in configuration and operation as the markup content controller 102 except as is discussed herein.

Inclusion of a link rewriting module 120 may promote mobile browsing between web pages over that experienced with mobile browsers implementing standard content. The link rewriting module 120 may function as a proxy for second content referenced in first content. If, for example, a web page references an external content source via a uniform resource locator (URL), the link rewriting module 120 may function to provide the second content in a mobile browser compliant manner. In the previous instance, the external content, i.e., the target content, is proxied with the original URL included as an argument. The target content is downloaded from the external content provider and the content is corrected and transcoded for the mobile browser 113. In a specific example, a HTML (the first-markup language) link, included in first content, is re-pointed to the proxy holding the revised content. In the foregoing manner, the user may have a rich browser navigation experience.

A mobile device 104 may access the network 114 via a wireless communication link 122. For instance, a browser 113, resident on the mobile device 104, presents second-markup language content which is supported by the mobile device. The second-markup language permits content display in a mobile-friendly manner. Second-markup language may allow for stream-lined presentation on a mobile device screen, account for mobile device processor configurations, account for wireless communication rates, accept limited input functionality. For example, a smart phone 104 having a limited screen size 202, in comparison to a fixed personal computer, limited physical inputs 206 in comparison to a full Qwerty keyboard and pointing system, or similar functionality. Examples of acceptable second markup languages include, but are not limited to, wireless markup language (WML), extensible hypertext markup language (XHTML), compact hypertext markup language (cHTML). In specific instances, device specific markups are implemented to increase the mobile browsing experience. Device specific markups may address mobile browser idiosyncrasies, e.g., does the browser support tables the maximum amount of content that can be returned, and so on.

While the Internet is referenced throughout the previous discussion, other networks are suitable as well. For example, the network may include a wide area network (WAN), a local area network (LAN), a wireless network, a public telephone network, an intranet, and so on. Other markup languages are acceptable and contemplated as well. Although a network 114 is shown, the network may be configured to include multiple sub-networks.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer readable memory devices, e.g., memory. The markup content controller 102 may be formed as hardware, software, a hybrid of hardware and software, firmware, stored in memory, as a set of computer readable instructions embodied in electronically readable media, etc.

The following discussion describes transformation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 3:
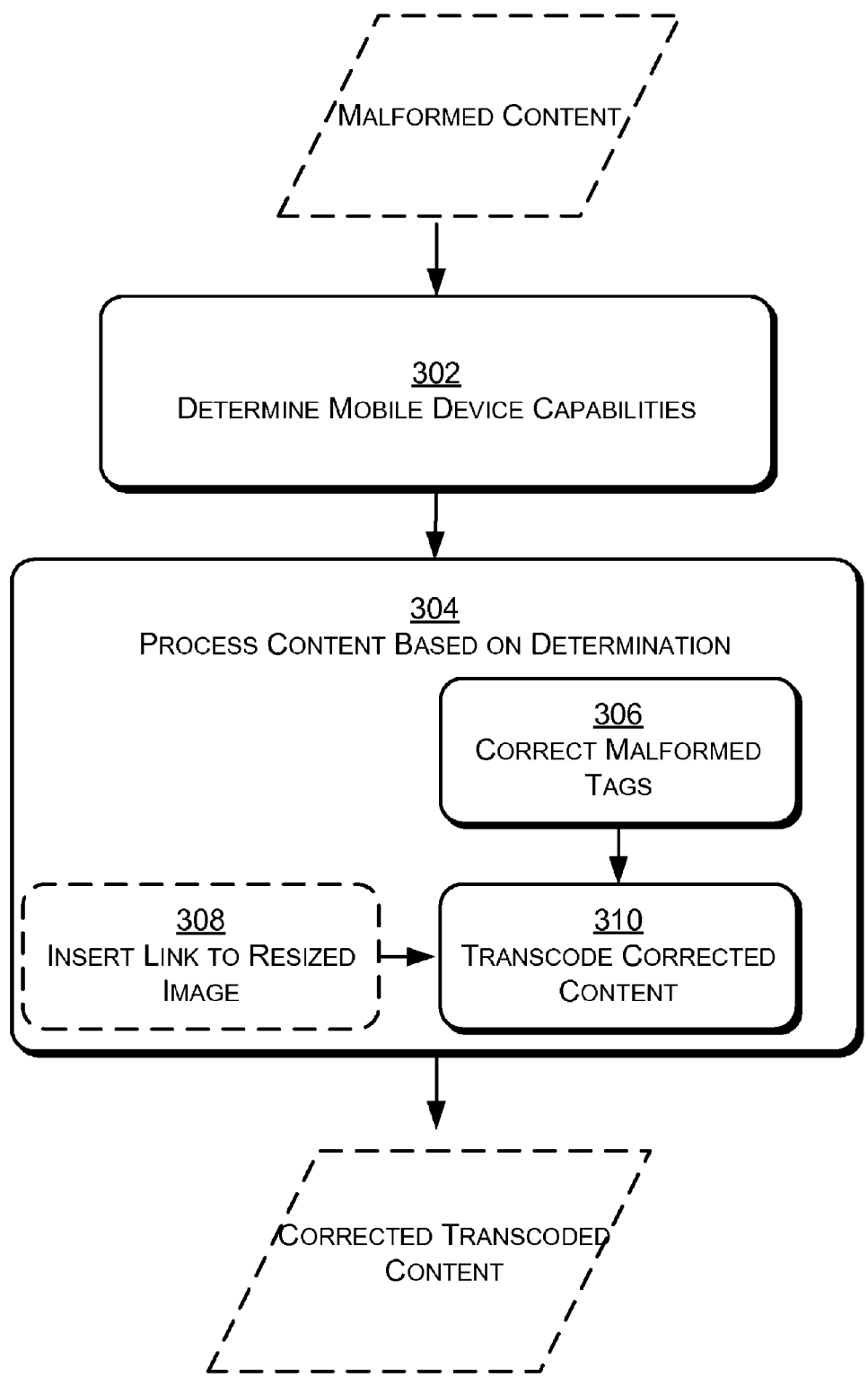
FIG. 3 is a flow diagram depicting a procedure in an exemplary implementation in which malformed content is processed into mobile browser compliant and supportable content based on determined capabilities of a mobile device.

FIG. 3 discloses an exemplary procedure of transforming malformed content into corrected transcoded content. The procedure includes determining 302 mobile target browser capabilities. The determination 302 may be made based on header information provided as part of the content request. For instance, the ASP.NET's Mobile Control's infrastructure may be queried to obtain the HTTP request, from the mobile browser, for comparison to a list of known agents. If a match is found, the known browser capabilities are provided. Capabilities include, but are not limited to, supported markups, screen size, specific transforming idiosyncrasies (e.g., does the target browser support table), maximum content return, and so forth.

Optionally, markup tags or scripts having an undesirable characteristic may be removed from the content. For example, a JavaScript (JAVA, Sun Microsystems, Santa Clara, Calif.), is removed as the script may include a virus. In another example, a markup may be removed because the tags are of a class which is capable of being dangerous rather than having been specifically identified as dangerous. For example, scripts and markup tags meeting or exceeding a predetermined safety criteria threshold are eliminated in order to minimize the risk to the mobile device. Additionally, the safety criteria level may be adjusted as desired. Removing questionable tags and scripts prior to transmission to the mobile browser may minimize the burden on a mobile device to remove the undesirable material.

The malformed content may then be processed 304 based on the determined capabilities. The content, for instance, may be corrected 306 to fix-up malformed tags within the content. Correcting 306 may include fixing-up malformed content (such as, inserting closing tags) to provide substantially complete content. For instance, a close paragraph tag may be included to ensure the relevant text is displayed as a paragraph. Correcting 306 may also be based on the determined characteristics 302. For instance, the content may be corrected to account for resolution of a mobile device, inputs supported by the mobile, the memory capabilities of the mobile device, and so on. Correcting 306 may ensure that the content is sufficiently well formed for rendering in accordance with the target mobile browser. In this way, the target mobile device does not have to handle these content issues.

Links to resized images may be included 308, such as, when an included image exceeds a predetermined size defined in the mobile target browser capabilities. For example, the image may be resized if the image would exceed the display screen of the mobile device. In other instances, the image is resized if the file containing the image hinders downloading or data presentation. For instance, an image may be "degraded" if the original image is of a higher quality than is capable of being displayed on the mobile device or if download the image would take an excessive amount of time in comparison to the determined capabilities. In this situation, the original image tag is replaced with a link to the resized image generated by an adaptive transforming proxy (i.e., Windows Live Mobile Adaptive Transforming Proxy, Microsoft Corp., Redmond, Wash.) from the downloaded original image.

The transformed content is transcoded 310 from the first-markup language, which is not supported by a mobile device, into a second-markup language which is supported by the device. Exemplary second-markup languages include, but are not limited to, extensible hypertext markup language (XHTML), compact hypertext markup language (cHTML), and wireless markup language (WML). The particular markup language selected may be obtained from the captured agent which was utilized to determine 302 the mobile browser's capabilities. As discussed previously, transcoding 310 may include stripping out markup tags which are not supported by the mobile browser. In instances in which content exceeds the determined display capabilities, transcoding may include "breaking" the content up into display pages and paginating the content. The size of the content, per page, may be defined by the browser capabilities in order to provide a mobile device friendly experience.

The processed content may be returned to the hosting page for transmission to the mobile device. For instance, the transformed content is returned to the host page so the processed content is transferred via a wireless link for display on the mobile device. A variety of other examples are also contemplated.

Figure 4:
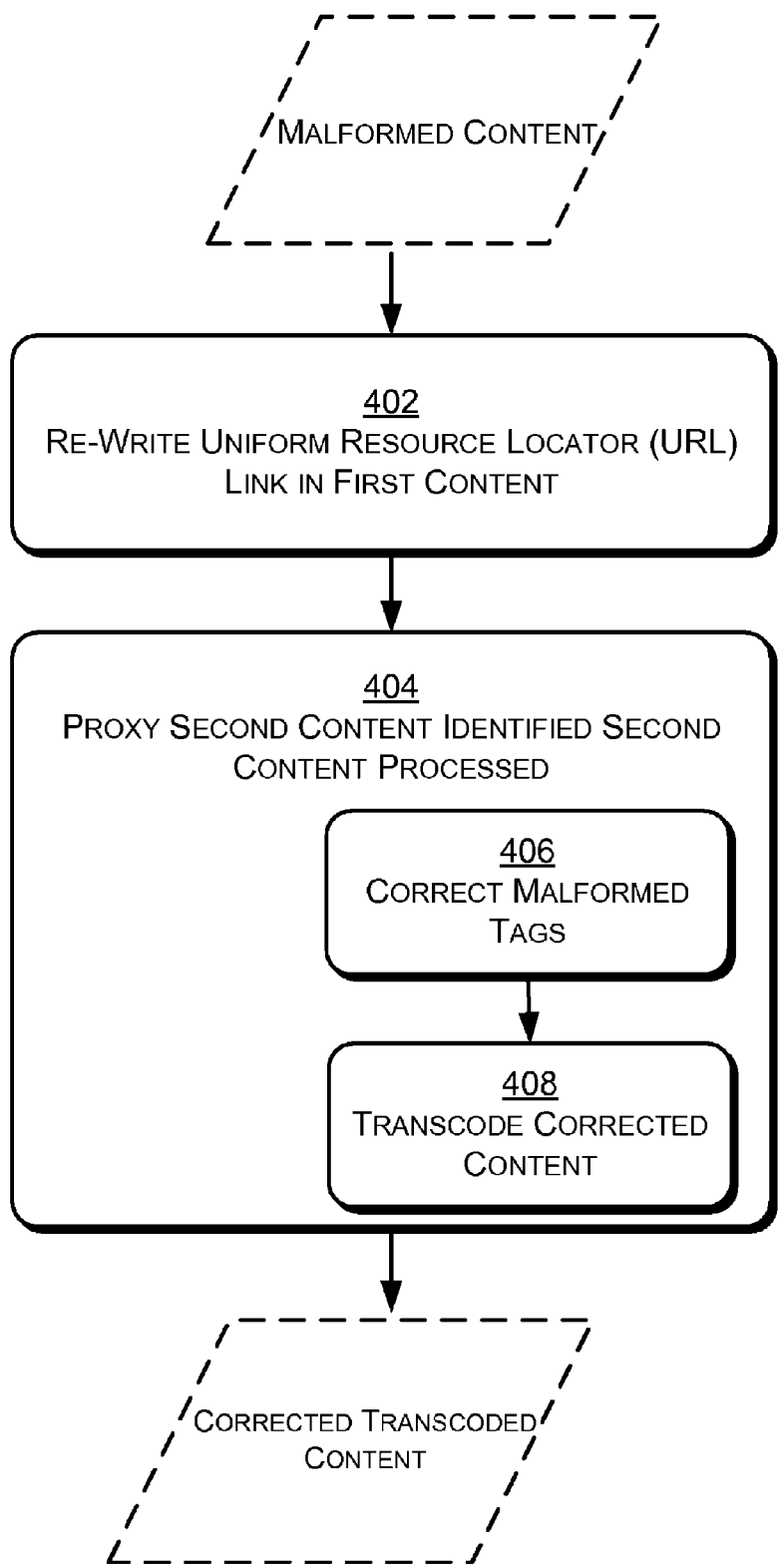
FIG. 4 is a flow diagram depicting a procedure in an exemplary implementation in which URL identified content is proxied for presentation on a mobile device.

Referring to FIG. 4, in further examples are discussed in which computer-readable media comprising computer-executable instructions that, when executed, direct a processor, included in a computing system, to rewrite a link to ensure URL referenced second content is provided in a mobile browser friendly manner. Further, the software and acts of the present example may be integrated into the procedure discussed with respect to FIG. 3 or incorporated into software capable being capable of correcting transcoding and/or rewriting. The instruction may permit handling of first content including a link to externally provided second content. For instance, a URL link, referring to external content, is included in a first web page. The computer-executable instructions rewrite 402 a URL link to point to proxied 404 second content. If, link rewriting were not applied, a mobile device attempting to access the content may have difficulty handling the content, present the content in an ill-formed manner or not be able to obtain the second content. The referenced content may be downloaded for processing. In this instance, the referenced content, i.e., the target content, is corrected to ensure the content is sufficiently robust or compliant for efficient presentation by the mobile device. Images may be resized and a resized image link included, if desired (discussed above). Markup tags and scripts not meeting a safety threshold or criteria also may be removed. The corrected second content 406 is transcoded 408 into second markup language for proxying 404. In this way, a mobile device user experiences the proxied second content in a mobile friendly manner in comparison to the original content.

If, the referenced content is authored for mobile browsers, link rewriting is altered to accommodate the content. If the referenced content is authored for mobile browsing and includes particular attributes, the attribute is passed through link rewriting, but is recognized so the attribute is present in the mobile browser content. If an element in the target content has a Multipurpose Internet Media Extension (MIME) TYPE attribute, the MIME attribute is recognized for utilization in transforming the data. Examples of "A" element having a TYPE attribute include;

- If the TYPE attribute is "application/x-gadget, and if the transformer's GadgetFormatString property is set to some non-empty string value, the URL of the A element will be re-written to match the value of the GadgetFormatString property, with {0} replaced by the URL-encoded value of the original URL. (This may be used for links to other pages within the same application.)
- If the TYPE attribute is "application/x-direct", and if the transformer's IsDirectLink Supported property is set to true, the URL of the A element will be preserved. (This may be used for links to external content sites that are known to be capable of mobile transforming.)
- If the TYPE attribute is "application/x-render", the URL will be rewritten to point to the Adaptive Transforming proxy. (This may be used for links to sites which are known to require more robust computing (e.g., desktop computers).

Explicitly setting the above attributes for the hosted transformer permits content developers to generate mobile browser orientated web applications without having to directly develop support for mobile markup languages.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented by a server having a processor executing instructions stored in a computer-readable storage media, the method comprising:
    receiving, by the server, a request from a mobile device for accessing first content in a first-markup language;
    determining capabilities of the mobile device for receiving and viewing the first content;
    processing the first content, by the server, based on the determined capabilities of the mobile device by:
        identifying certain types of markup tags and scripts in the first content as not meeting a predetermined safety criteria threshold;
        correcting the first content by removing from the first content the certain types of markup tags and scripts that do not meet the predetermined safety criteria threshold prior to transcoding;
        transcoding the first content from the first-markup language into a second-markup language that is supported by the determined capabilities of the mobile device;
        identifying in the first content an original uniform resource locator (URL) reference to second content stored at an external content source, the external content source comprising an external content provider in communication with the server via a network;
        rewriting the original URL reference in the first content to be directed to a proxy URL of the server to enable the server to act as a proxy to the second content at the external content source;
        replacing the original URL reference with a proxy URL reference that references the proxy URL in the first content transcoded into the second-markup language; and
        providing, to the mobile device, the first content transcoded into the second-markup language having the proxy URL reference, so that when the mobile device attempts to access the second content, the mobile device is directed to the server instead of the external content provider.

2. The method as described in claim 1, further comprising inserting a resized image link into the first content transcoded into the second-markup language based on the determining.

3. The method as described in claim 1, further comprising:
    subsequently receiving, by the server, a request from the mobile device for access to the proxy URL by selection of the proxy URL in the first content;
    accessing, by the server, the external content source based on the original URL to download the second content from the external content source; and
    transcoding the second content to the second-markup language for providing transcoded second content to the mobile device.

4. The method as described in claim 1, further comprising correcting malformed markup tags in the first content by identifying missing or unbalanced closing tags prior to the transcoding.

5. The method as described in claim 1, wherein the server functions as a portal for the first content derived from a first content provider of the first content.

6. The method as described in claim 1, wherein the determining the capabilities of the mobile device for receiving and viewing the first content is based on comparing a request header received from the mobile device with a list of known agents.

7. The method as described in claim 6, wherein, when a matching agent is found in the list of known agents, browser capabilities of the matching agent are obtained.

8. A system comprising:
- a server having a processor and a computer-readable storage media;
- a transforming module executed by the processor to receive first content requested by a browser and to identify certain types of markup tags and scripts in the first content as not meeting a predetermined safety criteria threshold, the transforming module correcting the first content by removing from the first content the certain types of markup tags and scripts that do not meet the predetermined safety criteria threshold prior to transcoding;
- a transcoding module maintained on the computer-readable storage media and executed on the processor to transcode the first content requested by the browser from a first-markup language that is not supported by the browser into a second-markup language that is supported by the browser; and
- a link rewriting module maintained on the computer-readable storage media and executed on the processor to:
  - identify, in the first content, an original uniform resource locator (URL) reference to second content stored at an external content source, the external content source being an external content provider in communication with the server via a network;
  - rewrite the original URL reference in the first content to be directed to a proxy URL of the server to enable the server to act as a proxy to the second content at the external content source;
  - replace the original URL reference with a proxy URL reference to the proxy URL in the first content transcoded into the second-markup language; and
  - provide the first content transcoded into the second markup language having the proxy URL to the browser.

9. The system as described in claim 8, the server being further configured to subsequently receive a request from the browser for access to the proxy URL by selection of the proxy URL in the first content by the browser, access the external content source based on the original URL reference to download the second content from the external content source, and transcode the second content to the second-markup language for providing transcoded second content to the browser.

10. The system as described in claim 8, wherein malformed tags in the first content are corrected by the transforming module by identifying missing or unbalanced closing tags prior to transcoding the first content.

11. The system as described in claim 8, wherein the transforming module inserts an image link, in the first content, for an image that is resized based on determined capabilities of the browser.

12. The system as described in claim 8, wherein the transcoding module paginates the first content based on determined capabilities of the browser.

13. The system as described in claim 8, wherein the transforming module determines capabilities of the browser based on comparing a request header received from a mobile device with a list of known agents.

14. The system as described in claim 13, wherein, when a matching agent is found in the list, known browser capabilities of the matching agent are provided.

15. One or more computer-readable media comprising computer-executable instructions that, when executed, direct a computing system to:
- serve as a first content provider server for providing first content, the first content being stored by the first content provider server;
- receive a request for the first content from a mobile device for accessing the first content in a first-markup language;
- determine capabilities of the mobile device for receiving and viewing the first content;
- correct the first content by correcting malformed markup tags in the first content based on the determined capabilities of the mobile device, and by identifying certain types of markup tags and scripts as not meeting a predetermined safety criteria threshold, the first content being corrected by removing from the first content the certain types of markup tags and scripts that do not meet the safety criteria threshold;
- transcode the corrected first content from the first-markup language into a second-markup language that is supported by the determined capabilities of the mobile device, the transcoding including stripping out markup tags which are not supported by a browser of the mobile device;
- rewrite an original uniform resource locator (URL) link, included in the first content, that points to second content stored in an external content source in communication with the first content provider server via a network, the rewritten URL link pointing to proxied second content retrieved by the first content provider server from the external content source;
- replace the original URL link in the corrected first content transcoded into the second-markup language with the rewritten URL link;
- provide the corrected first content transcoded into the second markup language having the rewritten URL link to the mobile device, so that when the mobile device attempts to access the second content using the rewritten URL link, the mobile device is directed to the first content provider server instead of the external content provider;
- receive a request from the mobile device for access to the proxy second content by selection of the rewritten URL link in the first content; and
- correct and transcode the second content into the second-markup language for providing corrected and transcoded second content to the mobile device.

16. The one or more computer-readable media as described in claim 15, wherein correcting the malformed markup tags comprises identifying missing or unbalanced closing tags.

17. The one or more computer-readable media as described in claim 15, wherein the proxy second content is corrected to include a resized image link based on the determined capabilities of the mobile device.

18. The one or more computer-readable media as described in claim 15, wherein first-markup language is hypertext markup language (HTML), and the second-markup language into which the first content is transcoded is compact hypertext markup language (cHTML).

* * * * *

UNITED STATES PATENT AND TRADEMARK OFFICE
CERTIFICATE OF CORRECTION

| | |
|---|---|
| PATENT NO. | : 7,853,593 B2 |
| APPLICATION NO. | : 11/689335 |
| DATED | : December 14, 2010 |
| INVENTOR(S) | : Frank S. Serdy, Jr. et al. |

Page 1 of 1

It is certified that error appears in the above-identified patent and that said Letters Patent is hereby corrected as shown below:

On the Title Page,

Column 1, Item (75), Inventors: change "Krkland" to -- Kirkland --.

Signed and Sealed this
Twenty-sixth Day of April, 2011

David J. Kappos
*Director of the United States Patent and Trademark Office*